A. SPADONE.
Vulcanized-Rubber Roll.

No. 199,116. Patented Jan. 8, 1878.

Witnesses:
T. C. Brecht
Geo. W. Poucher

Inventor:
A. Spadone

UNITED STATES PATENT OFFICE.

AMADEE SPADONE, OF JERSEY CITY, NEW JERSEY.

IMPROVEMENT IN VULCANIZED-RUBBER ROLLS.

Specification forming part of Letters Patent No. 199,116, dated January 8, 1878; application filed December 5, 1877.

*To all whom it may concern:*

Be it known that I, AMADEE SPADONE, of Jersey City, in the county of Hudson and State of New Jersey, have invented certain new and useful Improvements in Vulcanized-Rubber Rolls; and I do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1:
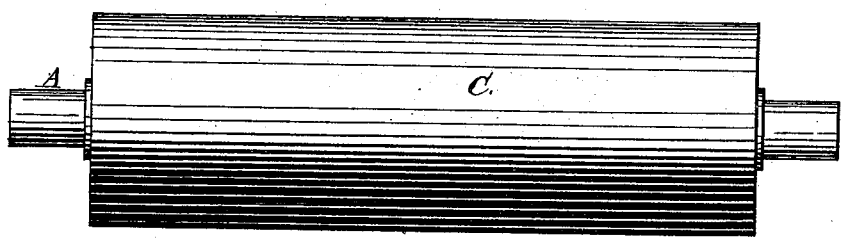
Figure 2:
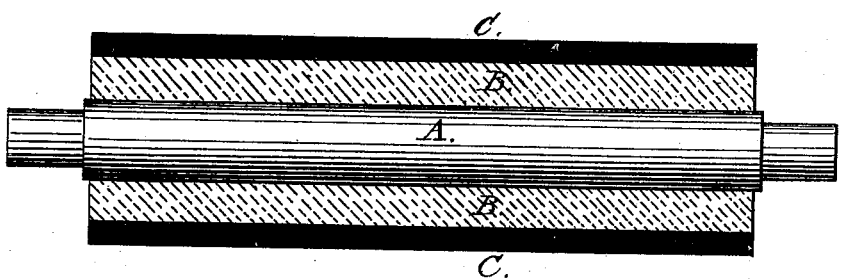
Figure 3:
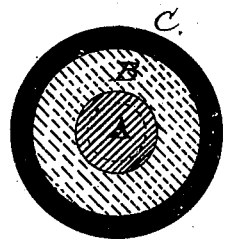

Figure 1 shows a perspective view of a roll with my invention; Fig. 2, a longitudinal section, and Fig. 3 a cross-section, of the same.

The usual base for forming printers' inking-rolls is an iron core covered with wood. Around this base the roller composition is molded. The usual compositions for the outer part of the roll are made of glue and molasses, or of glue, glycerine, and molasses, or some preparation having similar properties. A thickness of such composition varying from three-fourths of an inch to an inch or more is required with the ordinary base to give the requisite softness and elasticity. With my improvement this thickness may be diminished and a better roll obtained. These compositions for rolls form, however, no part of my invention, and therefore need not be particularly described, since any of the compositions now employed may be used with the rubber base, which constitutes my invention.

The following description will enable others to make and use my invention.

In the drawing, A is the core, of iron or other suitable metal, provided with the usual journals; or this part may be of wood, or wood and metal. B is a vulcanized soft-rubber base upon this core. C shows the position of the inking composition, which needs not be more than from one-fourth to three-eighths of an inch in thickness.

The manner of preparing rubber and other gum for forming the soft elastic vulcanized rubber, and the necessary apparatus for vulcanizing such composition, being well known to rubber-manufacturers, need not be especially described. The degree of hardness or softness that may be required for special cases can be easily regulated by varying the relative proportions of gum and sulphur. A harder kind of vulcanized rubber may be used near the center of the roll than in the outer portion.

The practical advantages of my invention are numerous: A saving in the quantity of composition used to cover the rolls of from one-eighth to three-fourths of the amount now used. This saving is important, for rolls are re-covered very frequently—by newspaper establishments as often as once a week; by ordinary printers, say, once in a month. The printing is improved by my invention, for the reason that the rubber backing to the composition, being of a pliable nature, yields to the pressure of the types, and yet presents a stiffer surface to the types, thus distributing the ink evenly, so that the color is the same in the center of large types and cuts as it is on the edges. When rollers are covered with composition only, and are used over types or cuts of large surfaces, the soft nature of the composition causes the pressure to come on the edges, while the centers do not get the same pressure, and therefore less ink is distributed to these, and the color is lighter and not as uniform as when my invention is used. This fact has been amply demonstrated by practical tests.

Another advantage is, that as I do not allow the composition to come in contact with wood, the water in the composition, which keeps it soft, is not absorbed, for the rubber does not absorb water, and consequently the moisture remains longer and the roller lasts much longer, and hence is more economical.

In all branches of printing letters, pictures, lithography, &c., the ordinary composition-covered roller is used, so that my vulcanized-rubber base is applicable in all branches and departments of the printing business.

The rubber base may be covered with cloth or silk or other material before the composition is put on, in order to facilitate the removal of the composition, when necessary.

I do not claim, broadly, a vulcanized-rubber roll, as such have been made for various purposes, as by drawing a tube over a shaft, by cementing strips or sheets of rubber around a core, and by covering rolls with raw rubber and gutta-percha. All such rolls, as heretofore made, have failed to answer the purpose of my invention, which is to diminish the amount of the coating compound required in inking-rolls, to secure an even and uniform deposit of ink upon the types and cuts, and to prevent the absorption of moisture from the glue compounds used for the outer coat.

The relative thickness of rubber base and the outer glue compound, to secure good practical results, should be substantially such as herein shown and described.

Having thus described my invention, what I claim, and desire to secure by Letters Patent, is—

1. In printers' inking-rolls, an elastic vulcanized-rubber base, substantially as and for the purpose set forth.

2. As a new article of manufacture, a printer's inking-roll consisting of a solid core, A, a vulcanized-rubber portion, B, and a composition, C, with or without an intermediate fabric between the portions B and C, as set forth.

In testimony that I claim the foregoing as my own I affix my signature in presence of two witnesses.

AMADEE SPADONE.

Witnesses:
  GEO. W. POUCHER,
  T. C. BRECHT.